July 19, 1966    J. A. SCHAUSTER    3,261,580
PIPE HANGER

Filed March 15, 1965    2 Sheets-Sheet 1

INVENTOR.
Joseph A. Schauster
BY
McCormick, Paulding & Huber

July 19, 1966    J. A. SCHAUSTER    3,261,580
PIPE HANGER
Filed March 15, 1965    2 Sheets-Sheet 2
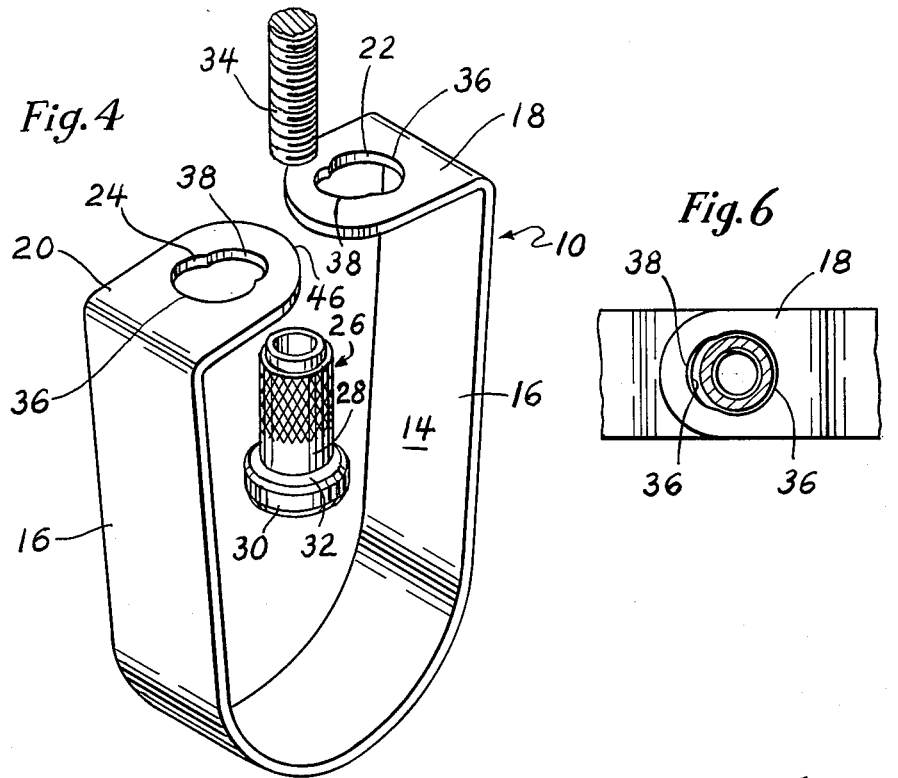
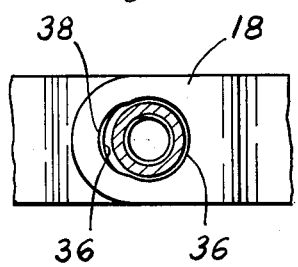
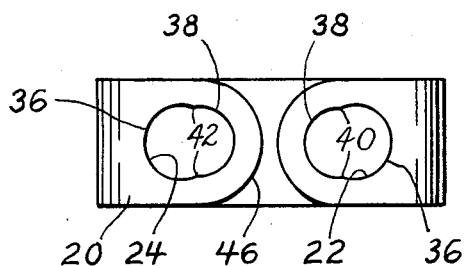
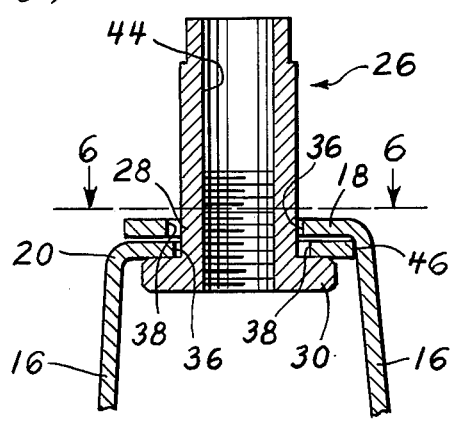

United States Patent Office 3,261,580
Patented July 19, 1966

3,261,580
PIPE HANGER
Joseph A. Schauster, Manchester, Conn., assignor to The Empire Tool & Manufacturing Company, Manchester, Conn., a corporation of Connecticut
Filed Mar. 15, 1965, Ser. No. 439,874
5 Claims. (Cl. 248—62)

This invention relates to a device for hanging or suspending pipes and the like from overhead supports and more particularly to an improved pipe hanger which may be suspended in self-locking, adjusted position from a threaded supporting rod or bolt.

The general object of the invention is to provide a pipe hanger which is self-locking in adjusted, pipe-supporting position and which is also of simple and inexpensive construction, readily capable of being mass produced.

A further object of the present invention is to provide a pipe hanger which may be readily and quickly installed and adjusted in pipe-supporting position, readily removed therefrom, and which is generally adaptable for substantially all pipe-supporting requirements.

Hangers for supporting pipes, cables, conduits and the like from overhead supporting structures are generally provided in a variety of different sizes and shapes to meet varying requirements. Such hangers generally comprise a pipe receiving portion and include a nut to secure the pipe receiving portion in adjusted position suspended from a stud, threaded bolt or the like attached to an overhead supporting structure. Since hangers of this general character are commonly used to support the piping and sprinkler heads of overhead fire prevention systems, particular care must be exercised in the installation of the hangers to prevent rotation of the supporting nut on the bolt after installation of the hanger due to vibration or other similar causes. It is obvious that such rotation of the nut will affect the vertical adjustment of the hanger and its supported pipe which very conceivably may cause a malfunction in a sprinkling system at a critical time when dependable operation is most necessary. Rotation of the nut may in some cases cause the hanger to become completely detached from the suspending bolt, possibly causing breakage or leakage in the supported piping system.

A common practice used to prevent such rotation of the supporting nut is the use of additional lock nuts or the like in conjunction with the suspending bolt. The present invention, however, contemplates improved structure including means integral with the pipe receiving portion of the hanger which will permit dependable self-locking adjustment of the hanger, obviating the requirement for lock nuts, lock washers or other similar devices.

Other objects and advantages of the present invention will become more readily apparent from the following description and drawings which show a preferred embodiment of the invention, and such embodiment will be described; but it will be understood that various changes and modifications may be made from the construction disclosed, and that the drawings and description are not to be construed as defining or limiting the scope of the invention, the claims forming a part of the specification being relied upon for that purpose.

In the drawings:

FIG. 4 is an exploded view of the pipe hanger of the present invention shown with the parts thereof in disassembled relation and with the strap or pipe receiving portion shown in relaxed position.

FIG. 5 is an enlarged fragmentary sectional view of the upper portion of the strap and supporting nut in assembled relation and permitting rotative movement of the nut with respect to the strap.

FIG. 6 is a view similar to FIG. 3 taken on line 6—6 of FIG. 5.

FIG. 7 is a plan view of the strap illustrating the self-locking means included in the present invention.

Figure 1:
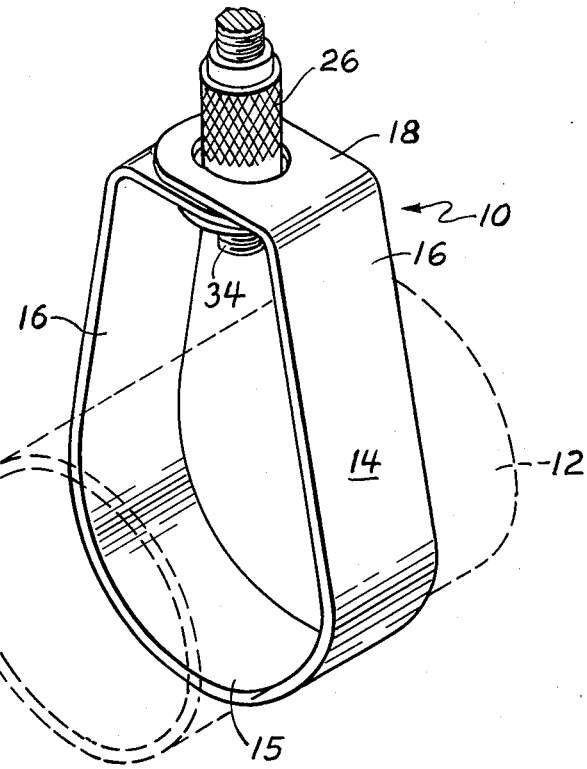
FIG. 1 is a perspective view of a pipe hanger embodying the present invention shown in adjusted position on a suspending stud and supporting a pipe shown in broken lines.
Figure 2:
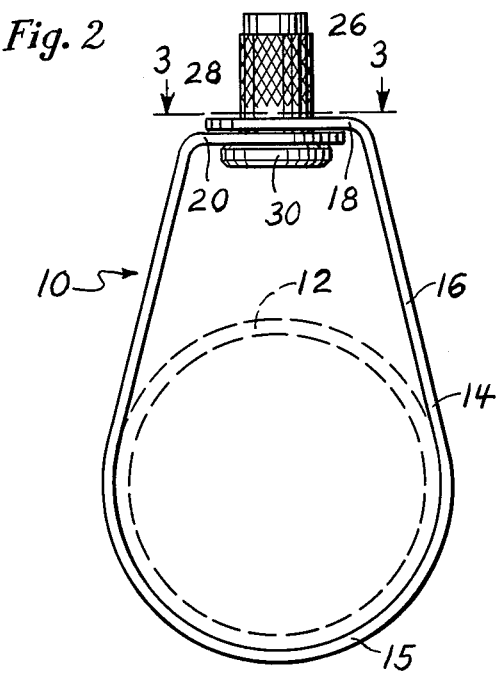
FIG. 2 is an elevational side view of the hanger shown in FIG. 1.
Figure 3:
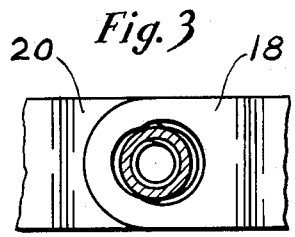
FIG. 3 is a fragmentary view, partly in section, taken on line 3—3 of FIG. 2.

Referring to the drawings, the pipe hanger 10 is shown supporting a pipe 12 and comprising an elongated, one-piece resilient strap 14 which is preferably a sheet metal stamping bent as shown to form a substantially U-shaped pipe receiving portion 15 having opposed sides 16, 16. The said sides or arms are formed with inturned terminal portions 18 and 20 adapted to be pressed toward each other into overlapping, substantially parallel relationship as shown in FIGS. 1 and 2, but the arms normally spring apart as shown in FIG. 4.

The terminal portions 18 and 20 are each apertured as best shown in FIGS. 4 and 7 at 22 and 24 to receive an elongated, cylindrical nut 26 therethrough when aligned as shown in FIG. 5. The purpose of having the strap portion 14 made of metal having resilient characteristics is so that it will exert a clamping force upon the opposite sides of the body portion 28 of the nut 26 after it has been inserted through the apertures 22 and 24 and after the pressing force or grip on the strap arms 16, 16 has been relaxed.

The nut 26 is formed with an enlarged annular flange 30 on the lower end of the body 28. The flange has a diameter greater than the diameters of the apertures 22 and 24 thereby providing a shoulder or supporting surface 32 upon which the terminal portions 18 and 20 rest to support the strap 14 in suspended position. The nut 26 is internally threaded to receive a threaded stud or bolt 34 depending from an overhead support.

It is to be noted that each aperture or opening 22, 24 is identically, but oppositely, formed and is defined by arcs 36 and 38—the arc 36 having a radius larger than the radius of the cylindrical body portion 28; and the arc 38, having a radius smaller than that of the cylindrical body portion 28. The center of each of the arcs if preferably located on a line common with the longitudinal centerline of the strap 14, the center of the arc 36 lying inwardly of the center of the arc 38 with respect to the end of the terminal portions of the strap. As can be best seen in FIG. 7 of the drawing, the apertures 22 and 24 are thus each provided with transversely opposed projections or points 40, 40 and 42, 42 respectively, formed at the intersections of the arcs 36, 36 with the arcs 38, 38. While the radii of the arcs may vary, the radius of the arc 36 is larger than that of the body portion 28, and the radius of the arc 38, less than that of the body portion. It is, however, essential that the distance between the transversely spaced-apart points 40, 40 and 42, 42 be less than the outside diameter of the body portion of the nut 26.

In use, the hanger of the present invention is installed by first securing the stud 34 to an overhead support in a manner to permit the bolt to extend downwardly therefrom. The metal strap 14 can be positioned on the pipe by passing one end of the pipe between the opposed sides thereof or the sides can be drawn apart to permit the pipe to pass between the inturned terminal portions 18 and 20. The terminal portions may be brought into substantially parallel, overlapping relationship by pressing the sides 16, 16 together to bring the apertures 22, 24 into registry. By aligning the arcs 36, 36 it can be seen that a substantially circular opening will be formed having a radius larger than that of the body of the nut 26 permitting the body portion 28 to pass upwardly through the apertures 22 and 24 to receive the stud 34. It is apparent that the nut 26 may be readily rotated to achieve threaded engagement on the supporting stud 34 for vertical adjustment thereon so long as the apertures 22 and 24 are registered to align the arcs 36, 36 as described. The body portion 28 of the nut is preferably knurled as shown to facilitate adjustment of the nut on the stud.

When the nut 26 has been vertically adjusted on the supporting stud 34 as desired, the sides are released and the weight of the pipe 12 is supported by the strap upon the supporting shoulder 32 of the flange 30 as shown in FIGS. 1 and 2.

Upon releasing the sides 16, 16, the outward biasing force of the resilient strap 14 biases the sides outwardly of each other urging the arcs 36, 36 apart and the arcs 38, 38 together. It will be readily apparent that since the arcs 38, 38 have radii smaller than that of the body portion 28, the pairs of spaced points 40 and 42 bite into the body of the nut 26, locking it against rotation on the stud 34.

It is also apparent that further vertical adjustment of the nut 26 on the stud or removal of the nut from the bolt can be accomplished by urging the sides 16, 16 together, freeing the points 40, 42 from the nut to permit rotation of the nut on the stud 34.

It will be observed that the upper, inner surface 44 of the nut 26 is not threaded. The unthreaded portion serves as a guide in positioning the nut on the stud 34 during installation of the hanger. It can also be seen from FIG. 5 of the drawing that alignment of the arcs 36, 36 to permit passage of the body portion of the nut 26 through the registered apertures 22, 24 can be greatly facilitated by spacing the centers of the arcs 36, 38 from the end of the terminal portions 18, 20 a predetermined distance whereby when the sides 16, 16 are urged toward one another, the arcs 36, 36 will be aligned as described when the end 46 of the terminal portion 20 abuts the inner surface of the side 16. Therefore, the arcs 36, 36 may be quickly aligned to form the desired opening by merely grasping the hanger and urging the sides 16, 16 together until further movement is prevented by abutting engagement of the end 46 with the side 16.

It is apparent to one skilled in the art that the present invention provides a highly efficient and effective pipe hanger which is self-locking in adjusted pipe supporting position and which is generally adaptable for use with substantially all pipe supporting requirements.

The invention claimed is:

1. A pipe hanger adapted to be suspended from a depending threaded stud and comprising an elongated cylindrical nut engageable with the stud and having means defining an external support, a generally U-shaped metal pipe supporting strap having inturned terminal portions which can be pressed toward each other into substantially parallel overlapping relationship but which normally spring away from each other, each such terminal portion being provided with an elongated aperture having a longitudinally extending major dimension and which is defined by two intersecting arcs, the first arc being nearest the end of the terminal portion and being struck on a radius less than the outside diameter of the nut and the second arc being farthest from the end of the terminal portion and being struck on a radius greater than the outside radius of the nut and encompassing more than 180°, whereby the two points of intersection of the two arcs provide inwardly facing projections on opposite sides of the aperture, the larger arc portions of the apertures in the terminal portions being alignable when said terminal portions are pressed together and held whereby to receive the nut through said apertures to permit free rotation of the nut on the stud relative to the strap, and the projections in said apertures acting to engage said nut and to prevent rotation of the nut relative to the strap when said terminal portions are released, the strap then resting upon and being supported by the support on the nut.

2. A pipe hanger adapted to be suspended from a depending stud and comprising an elongated cylindrical nut engageable with the stud and having means defining an external support shoulder, a generally U-shaped metal pipe supporting strap having inturned terminal portions which can be pressed toward each other into substantially overlapping relationship but which normally spring away from each other, each such terminal portion being provided with an elongated aperture having a longitudinally extending major dimension and which is defined by two intersecting arcs, the first arc being nearest the end of the terminal portion and being struck on a radius less than the outside diameter of the nut and the second arc being farthest from the end of the terminal portion and being struck on a radius greater than the outside radius of the nut, the larger arc portions of said apertures in the terminal portions being alignable when said terminal portions are pressed together and held whereby to receive the nut through said apertures to permit free rotation of the nut on the stud relative to the strap, and means associated with the apertures engageable with the nut and acting to prevent rotation of the nut relative to the strap when said terminal portions are released, the strap then resting upon and being supported by the support shoulder on the nut.

3. A pipe hanger adapted to be suspended from a depending threaded stud and comprising an elongated cylindrical nut engageable with the stud and having means defining an external support shoulder, a generally U-shaped metal pipe supporting strap having inturned terminal portions which can be pressed toward each other into substantially parallel overlapping relationship but which normally string away from each other, each such terminal portion being provided with an aperture having an inwardly facing projection on the periphery thereof, the apertures being alignable when the said terminal portions are pressed together and held whereby to receive the nut through said apertures to permit free rotation of the nut on the stud relative to the strap, and the projections in said apertures acting to engage said nut and to prevent rotation of the nut relative to the strap when said terminal portions are released, the strap then resting upon and being supported by the support shoulder on the nut.

4. A pipe hanger as set forth in claim 1, wherein the cylindrical nut includes an internally threaded cylindrical body portion and a radially extending annular flange spaced inwardly from one end thereof to form the external support, said annular flange having a radius greater than the radii of the said intersecting arcs whereby the terminal portions are supported upon the flange when the hanger is in pipe supporting position.

5. A pipe hanger as set forth in claim 2, wherein the cylindrical nut includes an internally threaded cylindrical body portion and a radially extending annular flange spaced inwardly from one end thereof to form the support shoulder, said annular flange having a radius greater than the radii of the said intersecting arcs whereby the terminal portions are supported upon the flange when the hanger is in pipe supporting position.

References Cited by the Examiner

UNITED STATES PATENTS

| 649,270 | 5/1900 | Collins | 248—62 X |
|---|---|---|---|
| 2,177,816 | 10/1939 | Wertman | 248—60 X |
| 2,762,592 | 9/1956 | Adams | 248—59 |
| 2,944,778 | 7/1960 | Katis | 248—62 |
| 2,996,274 | 8/1961 | Marik et al. | 248—62 |

CLAUDE A. LE ROY, *Primary Examiner.*